(12) United States Patent
Akmandor et al.

(10) Patent No.: US 7,314,035 B2
(45) Date of Patent: Jan. 1, 2008

(54) ROTARY VANE ENGINE AND THERMODYNAMIC CYCLE

(76) Inventors: Ibrahim Sinan Akmandor, Planlamacilar Sitesi 160. Sokak No:3 Beysukent, Ankara 06810 (TR); Nazmi Ersöz, Kumlubel Mahallesi, Nimet Sokak No:27, Eskişehir 26220 (TR)

( * ) Notice: Subject to any disclaimer, the term of this patent is extended or adjusted under 35 U.S.C. 154(b) by 0 days.

(21) Appl. No.: 10/526,997

(22) PCT Filed: Sep. 9, 2003

(86) PCT No.: PCT/TR03/00071

§ 371 (c)(1),
(2), (4) Date: Mar. 7, 2005

(87) PCT Pub. No.: WO2004/022919

PCT Pub. Date: Mar. 18, 2004

(65) Prior Publication Data

US 2006/0124101 A1   Jun. 15, 2006

(30) Foreign Application Priority Data

Sep. 9, 2002  (TR) .............................. a 2002 02132
Sep. 8, 2003  (TR) .............................. a 2003 01486

(51) Int. Cl.
F02B 53/04   (2006.01)
F02B 53/00   (2006.01)
F01C 1/344   (2006.01)
F01C 1/00    (2006.01)
F04C 2/00    (2006.01)
F04C 18/00   (2006.01)
F02K 3/02    (2006.01)

(52) U.S. Cl. ...................... 123/236; 123/204; 418/256; 418/264; 60/226.1

(58) Field of Classification Search ............... 123/236, 123/204; 418/256, 264; 60/775, 226.1, 60/262; F01C 1/344, 1/356

See application file for complete search history.

(56) References Cited

U.S. PATENT DOCUMENTS

| 3,108,767 | A | * | 10/1963 | Eltis et al. ................. 60/226.1 |
| 3,780,530 | A | * | 12/1973 | Dooley et al. ............... 60/262 |
| 3,900,942 | A |   | 8/1975  | Ainsworth |
| 3,987,621 | A | * | 10/1976 | Sabatella et al. .......... 60/226.1 |
| 3,989,011 | A | * | 11/1976 | Takahashi ................... 123/204 |
| 4,553,513 | A | * | 11/1985 | Miles et al. ................. 123/204 |
| 4,876,850 | A | * | 10/1989 | Eickmann ................ 60/39.464 |
| 5,352,295 | A |   | 10/1994 | Chou ......................... 123/236 |

(Continued)

FOREIGN PATENT DOCUMENTS

DE   3128309   2/1983

(Continued)

*Primary Examiner*—Thai-Ba Trieu
(74) *Attorney, Agent, or Firm*—Adams & Wilks (57) ABSTRACT

A heat engine having a rotary vane compressor and a rotary vane turbine operates in a highly efficient thermodynamic cycle which includes a power expansion phase up to ambient pressure and a limited temperature constant volume combustion followed by a constant pressure combustion and/or a constant temperature combustion. A compound propulsion engine utilizing the thermodynamic cycle has a primary stage having an axial compressor and a rotary vane turbine, and a secondary stage having an axial turbine and a rotary vane compressor, the two stages being aero-thermodynamically coupled to each other without provision of an interconnecting drive shaft.

6 Claims, 10 Drawing Sheets

U.S. PATENT DOCUMENTS

| | | |
|---|---|---|
| 5,566,650 A | 10/1996 | Kruse |
| 5,596,963 A | 1/1997 | Lai .......................... 123/236 |
| 5,692,372 A | 12/1997 | Whurr |
| 5,839,270 A * | 11/1998 | Jirnov et al. .................. 60/775 |
| 6,236,897 B1 | 5/2001 | Lee et al. |
| 6,526,937 B1 * | 3/2003 | Bolonkin .................... 123/236 |
| 2005/0005898 A1 * | 1/2005 | Horstin ....................... 123/236 |
| 2006/0065232 A1 * | 3/2006 | Wurtz et al. ................ 123/204 |

FOREIGN PATENT DOCUMENTS

| | | | | |
|---|---|---|---|---|
| EP | 1016785 | 7/2000 | | |
| FR | 0538666 | 6/1922 | | |
| FR | 2539184 | 7/1984 | | |
| FR | 2541368 A | * | 8/1984 | |
| GB | 0697078 | 9/1953 | | |
| JP | 55107002 | 8/1980 | | |
| JP | 56156402 A | * | 12/1981 | ................. 123/236 |
| WO | 9853210 | 11/1998 | | |

* cited by examiner

ROTARY VANE ENGINE AND THERMODYNAMIC CYCLE

CROSS REFERENCE TO RELATED APPLICATIONS

This application is a U.S. national stage application of copending International Application No. PCT/TR03/00071, filed Sep. 9, 2003, claiming priority dates of Sep. 9, 2002 and Sep. 8, 2003, and published in the English language.

FIELD OF THE INVENTION

This invention relates to energy systems and more particularly to componentry and thermodynamic cycle for enabling shaft work, propulsion drive, electric power source, jet propulsion and thermodynamic systems such as ventilation, cooling, heat, pressure or vacuum generating systems.

BACKGROUND OF THE INVENTION

Since the start of the industrial revolution, the reciprocating piston engine based on the Otto and Diesel cycles and, the gas turbine engine based on the Brayton cycle, have largely dominated the market. Despite this fact, for many years, patents on rotary combustion engines have claimed that rotary engines possess many advantages over reciprocating engines such as having high torque, fewer parts, lower weight and fewer reciprocating imbalance. Fundamental design characteristics of the present invention addresses the main problems related to rotary engines and bridges the mass flow and rotational speed gaps between reciprocating and gas turbine engines.

Avoiding Wear and Improving Sealing in a Vane Rotary Engine

Figure 6:
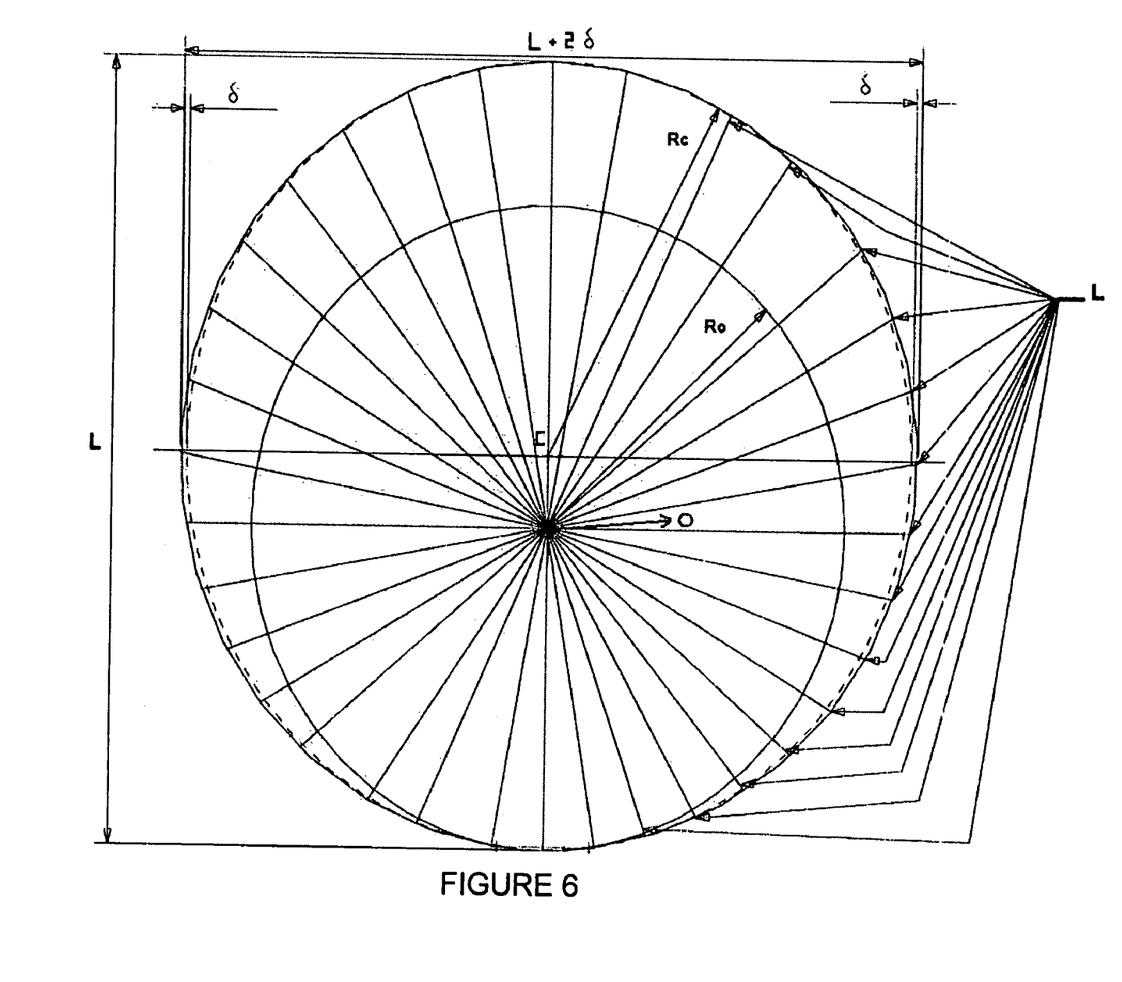
FIG. 6, geometry of the cycloid machined by enlarging by '2δ', the largest circle of diameter 'L' that fits the housing peripheral (88,97) FIG. 7, high efficiency, high power, low peak temperature new thermodynamic cycles (151*abceh*, 151*abcdfh*, 151*abcgh*) pertaining to the invention.

One reason for the lack of industrial attention is that many rotary engines have been faced by serious wear and sealing deficiencies. The main cause of the wear is the centrifugal force generated during high speed rotation that forces the vanes to scrap the inner peripheral of the working chamber. This has been recently addressed by using hinged vane central retention mechanisms (U.S. Pat. No. 5,352,295, Chou Yi, Oct. 4, 1994 and PCT WO 02/31318, VADING Kjell, Apr. 18, 2002). In such configurations, the sliding vane is articulated through a cylindrical slideable guidance placed between the rotor and the vane. While correcting the wear problem, the number of moving parts has increased and hence, the system became more complex. At worst, each one of said parts increases the probability of engine failure due to wear and fatigue. At best, the pressure sealing, lubrication and cooling capabilities of the vane mechanism deteriorates. In the present invention, the intermediary cylindrical slides are eliminated all together as the radially outer vane tips (86,109) are always in a natural contact with the housing inner peripheral (88,97). The basic reason for this natural contact is that the housing inner peripheral (88,97) is non-circular and has a cycloidal shape (FIG. 6) that accommodates perfectly an eccentrically placed sliding vane of fixed length (16,37,50,63,87,100,119, 125). The easy machining and manufacturing technique disclosed in this invention, is based on the side enlargement of the largest fitting circle within the cycloid (FIG. 6), and have not been mentioned by prior arts (U.S. Pat. No. 6,236,897, LEE and al., May 22, 2001; U.S. Pat. No. 5,996,355, Jirnov and al., Dec. 7, 1999; U.S. Pat. No. 4,422,419, UMEDA, Dec. 27, 1983). The said geometry (FIG. 6), given in the detailed description and the related claims of the invention below, has good sealing at all sliding vane position angles. Wear contacts generated by the sliding is vane tips (86,109) against the housing inner peripheral (88) are eliminated by a pivot axle vane retention mechanism (54, 55, 61, 62, 81, 82, 104, 105) centrally placed within the rotor.

Rotary Engines with Sliding Vane Slicing Through Rotor

Instead of having hinged vanes, some of the prior arts do use sliding vanes slicing through the rotor (U.S. Pat. No. 4,414,938, UMEDA Soei, Nov. 15, 1983 and U.S. Pat. No. 4,422,419, UMEDA Soei, Dec. 27, 1983; U.S. Pat. No. 5,596,963, LAI, Jui, H., Jan. 28, 1997). In these arts, a plurality of spring-loaded vanes are used against the housing wall to achieve air-tightness. Therefore, they fundamentally differ from the springless single "all-through solid" vane mechanism of the present invention. Furthermore, abovementioned prior arts do not have any central vane retention mechanism (138, 139, 150) that would prevent the related wear problem. Moreover, only a portion of the entire inner peripheral of the housing is elliptic. Another patent, related to rotary heat engine with 'all-through solid' vane (U.S. Pat. No. 5,511,525, JIRNOV and al., Apr. 30, 1996), uses at least two mutually perpendicular vanes with radially extending guide. The plural use of vanes within one compressor housing substantially reduces the pressure ratio. This leads to a reduction of the rotary component efficiency and also increase the system complexity as more stage is required. Furthermore, the vane guide path mechanism described in this prior art is an additional cause for increased friction wear.

Rotary Engines with Separate Compression and Expansion Chambers

There are many rotary engine patents which provide separate compression, combustion and expansion chambers (PCT WO 02/31318, VADING Kjell, Apr. 18, 2002; PCT WO 99/041141, O'BRIEN Kevin, Jan. 28, 1999; U.S. Pat. No. 5,596,963, LAI, Jui, H., Jan. 28, 1997; U.S. Pat. No. 5,335,497, MACOMBER Bennie D., Aug. 9, 1994; U.S. Pat. No. 5,352,295, YI Chou, Oct. 4, 1994; U.S. Pat. No. 5,235,945, TESTEA Goerge, Aug. 17, 1993). Actually, almost all rotary vane type engines produce very high torque because the combusted gas expands right against the hot section vane (37,63,100,119), which is the arm length of the generated torque. Therefore, not only is the crankshaft unnecessary, but when comparing engines of equal volumes, the power leverage on the drive shaft of a rotary engine is greater than that of a corresponding reciprocating engine. However, here too, there is room for improvement; the present invention overcomes the drawbacks and limitations of todays power and refrigeration cycles by proposing and implementing new high efficiency thermodynamic cycles (151abceh, 151abcdfh, 151abcgh)

Rotary Engine with Improved Thermodynamic Cycle

The present invention combines the advantages of Otto and Diesel cycles at intake, compression and combustion phases of the thermodynamic cycle by limiting the peak combustion temperature. The present invention also claims an expanded power stroke that greatly improves power extraction and efficiency. With a proper thermodynamic and geometrical match of the compressor and turbine working chambers, it is shown that the expansion process can be improved and lower exhaust pressure and temperature levels can be achieved. A search of the prior art did not disclose any rotary engine patent with separate compression and expansion chambers that considers and provides an expansion process that would take the combusted products further down to ambient pressure levels. The overlook of such thermodynamic cycle improvement is a major source of wasted energy that ultimately translates in engine fuel inefficiency. Accordingly, the present invention provides proper sizing of the compression and expansion chambers, the rotors, and the vanes so as to achieve optimum compression (151*ab*), combustion (151*bce*, 151*bcdf*, 151*bcg*) and expansion (151*eh*, 151*fh*, 151*gh*).

OBJECT OF THE INVENTION

One of the objects of this invention, is to increase the thermal efficiency above levels reached by today's heat engines. This is achieved by implementing a longer power extraction phase (151*eh*, 151*fh*, 151*gh*) and by realising high compression ratios with less shaft power input, by processing the fluid through a smooth crescent shape constriction (72 and 49 and 53). Another object of the present invention is to decrease the wear. Wear is minimised through the incorporation of the pivot axle vane retention mechanism (138, 139, 150) and by providing an efficient oil lubrication. The operational and maintenance costs are also minimised, as maximum peak temperature is limited. All together, the present invention discloses an efficient, powerful, compact, simple and reliable heat engine.

For the compound engine configuration of the instant invention, rotary components and gas turbine engine components have been matched with each other. The objective is to combine the high efficiency and "no-stall" characteristics of internal combustion engines with the high mass flow, smaller size and lighter weight characteristics of the gas turbine engines. Another objective is to eliminate the long, heavy and cumbersome concentric shafts and reduction gears that are present in today's turbofan, turboprops and turbojet engines. By simplifying the mechanical links and by integrating low mass flow rotary components, the implementation of high efficiency reheat and intercooling systems have become extremely feasible.

SUMMARY OF THE INVENTION

The solo configuration (FIGS. 1,2,3,4) of the invention relates to a rotary vane type machine comprising a compressor (10,19;46,48) and a turbine (36,43;57,59) housing, each having a crescent shape cavity. Each of these housing is receiving an eccentrically placed rotor (4,11,89,96,117) equipped by a radially movable single sliding vane (50,63) arranged in the rotor. The rotor receives a centrally placed pivot axle vane retention mechanism, which is comprised of a pin (139) and a pivot axle (150). The pin head fits into the vane centre socket. Both ends or tips (86,109) of the sliding vane (87,100,119,125) are extending radially outward and are in contact with the cycloidal inner surface of the housing peripheral (88,97) at all rotational angles. Within each housing, depending on the rotational position of the sliding vanes, forms a plurality of working chambers (49, 53, 60, 66, 72) each of the said chambers, delimited by the inner peripheral surface of the housing (48, 59), the outer peripheral surface of the rotor (90,98) and the side surface of the vane (16,37). With such configuration, the solo use of the turborotary engine of the invention overcomes the limitations of conventional internal combustion engines and enables significant improvement in power, torque and efficiency. The cycloidal housing inner peripheral eliminates any use of telescoping, articulated hinged vane mechanism and gives the engine of the invention a simple and naturally balanced configuration.

Figure 8:
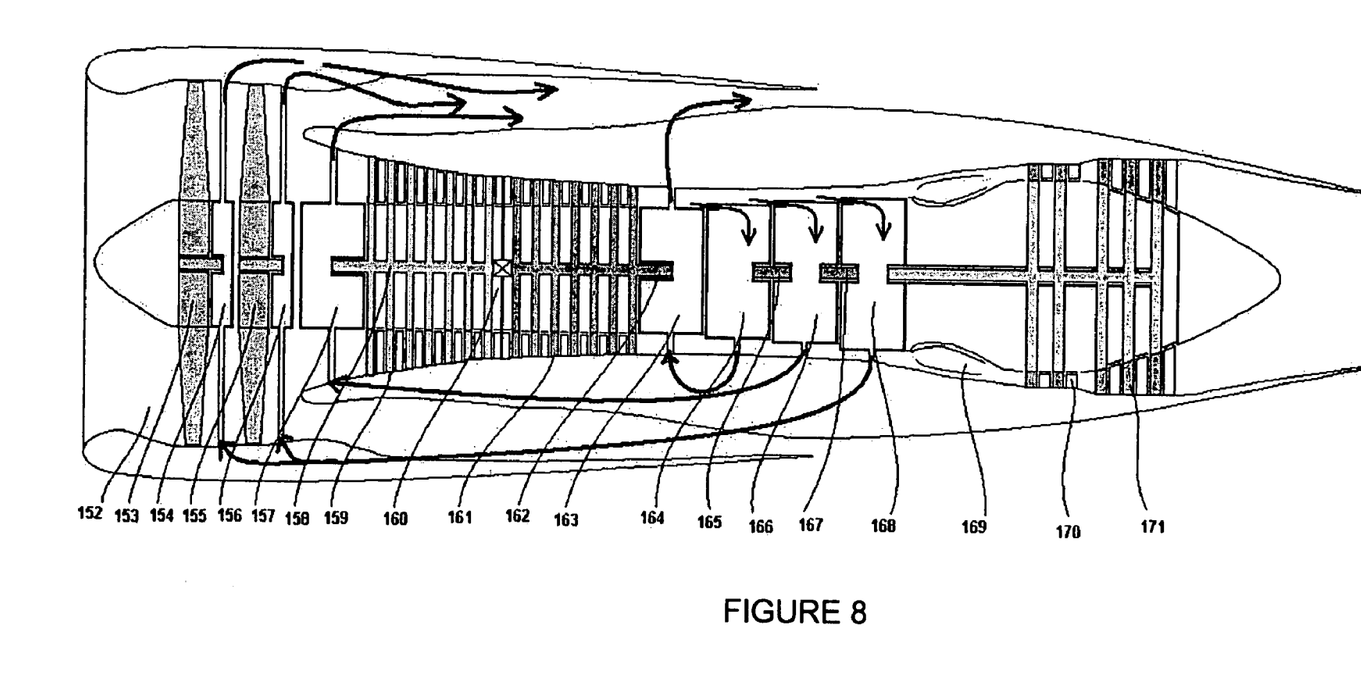
FIG. 8, turbo-rotary-fan compound engine
Figure 9:
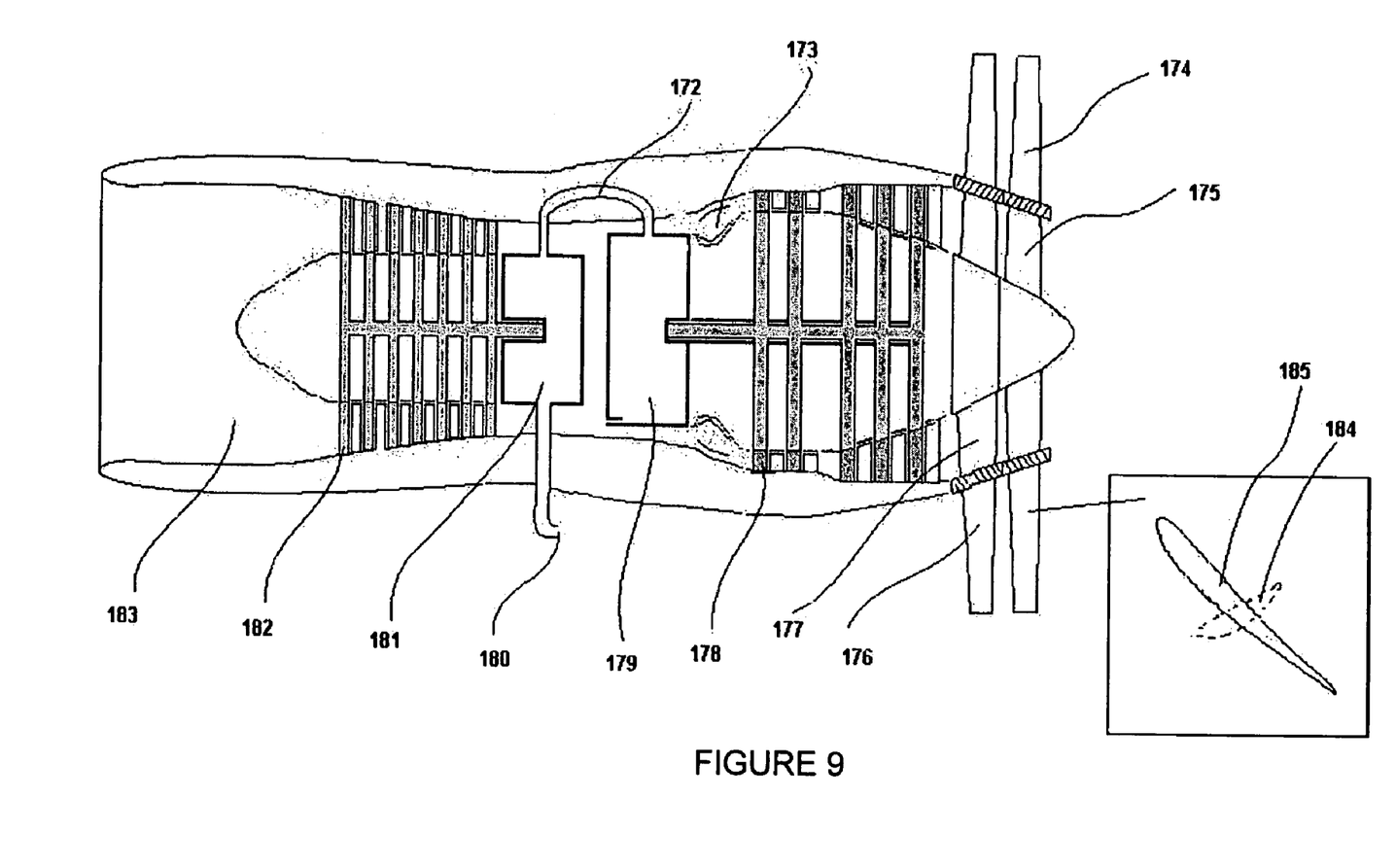
FIG. 9, turbo-rotary-prop compound engine
Figure 10:
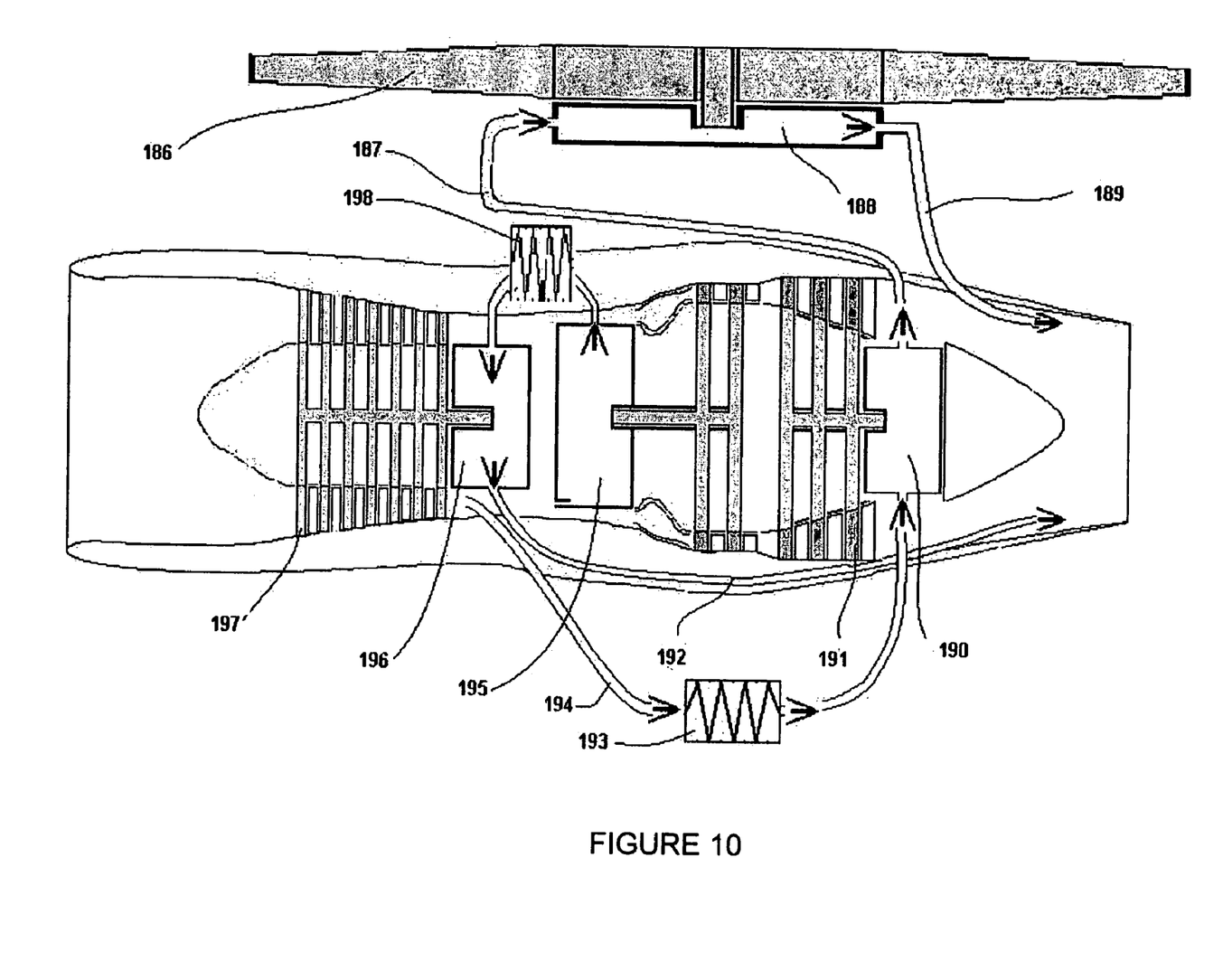
FIG. 10, turbo-rotary compound engine for helicopter or power applications.

For high mass flow rate, the present invention (FIGS. 8,9,10) extends the efficient but narrow operating range of the gas turbine engine by mechanically decoupling and eliminating the long shaft drive between the expander (turbine) and the turbo-compressor. Each said fan (153, 155) and compressor group (158, 161, 182, 197) is allowed to be driven at its own speed, by its own rotary turbine (154, 156, 157, 162, 181, 196) wherein, amounts of combustion fuel and air is delivered is dictated by the instantaneous compressor load requirements. Turbines (170, 171, 178, 191) drives rotary compressors (164, 166, 168, 179, 195, 190) that pumps high pressure fluid to respective rotary turbines. Therefore the present invention overcomes some of the off-design limitations of conventional gas turbine engines. Because of their low mass flow rate requirements, it also becomes extremely, cheap and useful to equip the system with intercoolers (193) and reheat (198) systems. Other features, advantages, and applications of the invention will be apparent from the following descriptions, the accompanying figures, and from the claims.

BRIEF DESCRIPTION OF THE DRAWINGS

The present invention is illustrated hereinafter through preferred and alternative embodiments wherein.

DETAILED DESCRIPTION OF THE INVENTION

Figure 1:
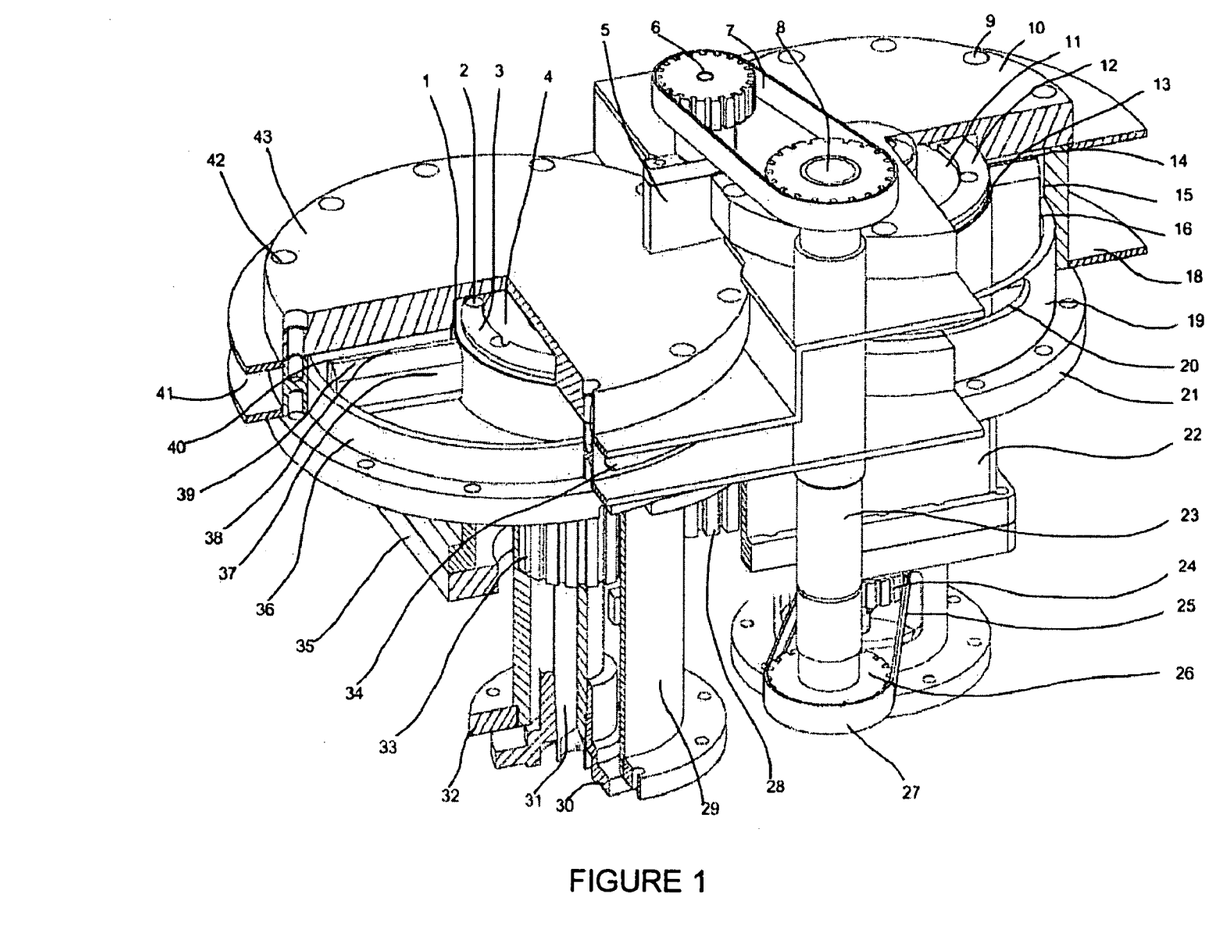
FIG. 1, is a schematic isometric view of a rotary engine where compressor (10) and turbine (43) housings are arranged in tandem. The gas transfer from the compressor to the turbine is sequenced by a rotor synchronised cyclo-valve. Combustion occurs within the turbine expansion chamber.
Figure 2:
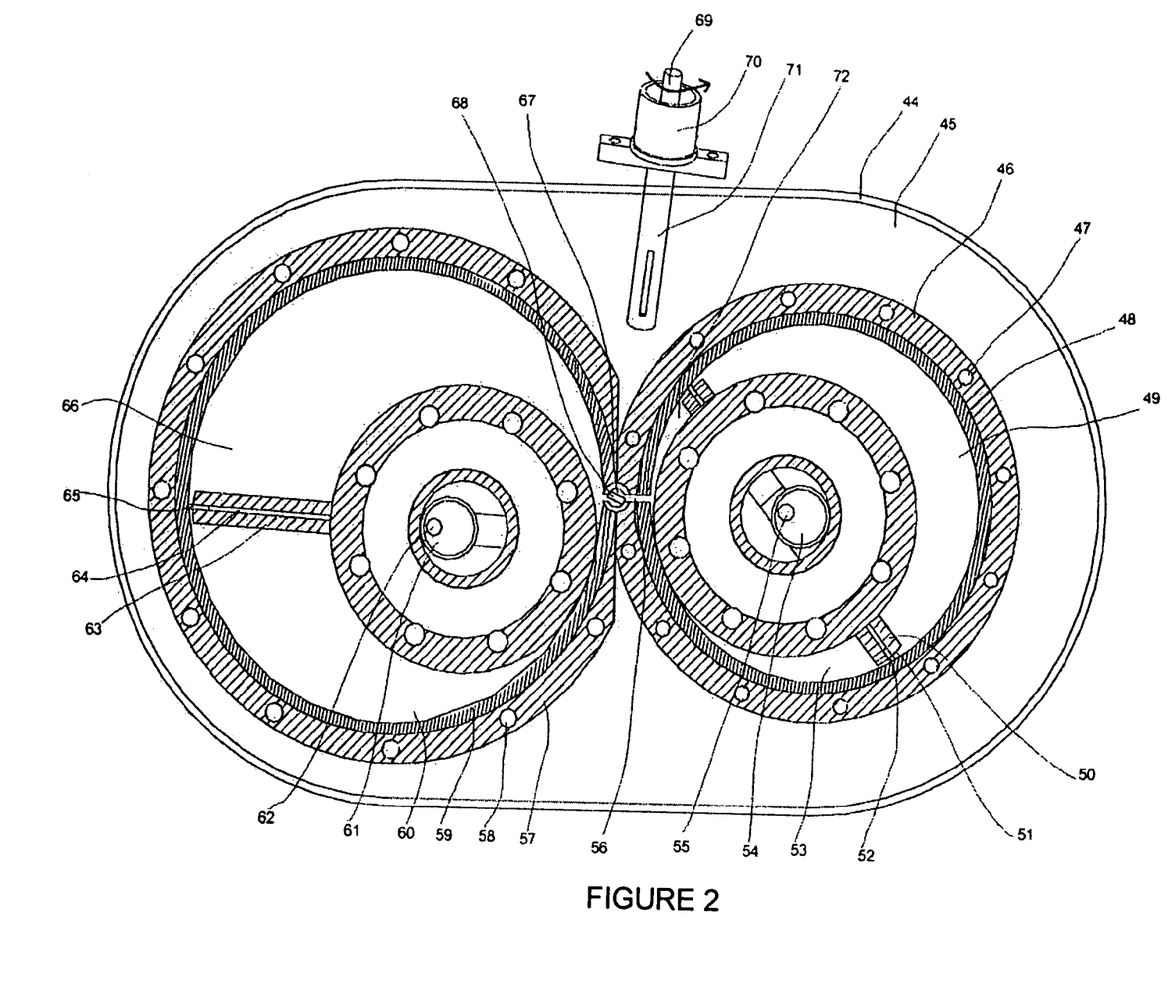
FIG. 2, is a schematic top view of the rotary engine of FIG. 1, sectioned at mid height of the turbine housing. Isometric view of the cyclo-valve (69, 70, 71) is added.
Figure 3:
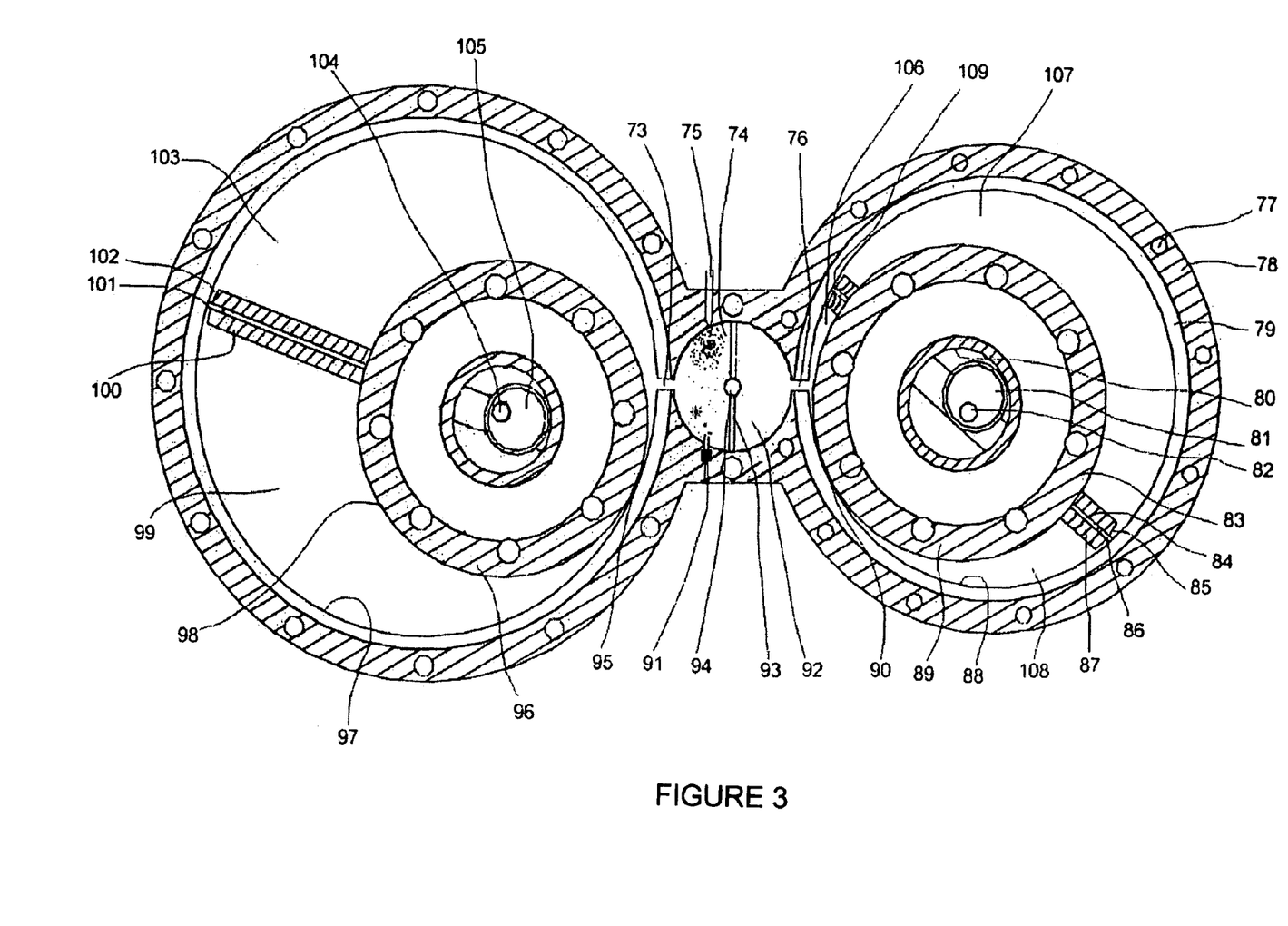
FIG. 3, is a schematic isometric view of a rotary engine where compressor and turbine housings are arranged in tandem. The gas is transferred from the compressor to the turbine through an intermediary cyclo-combustion chamber (74) synchronised with the rotational speed of the compressor and the turbine. Expansion occurs within the turbine chamber (103).
Figure 4:
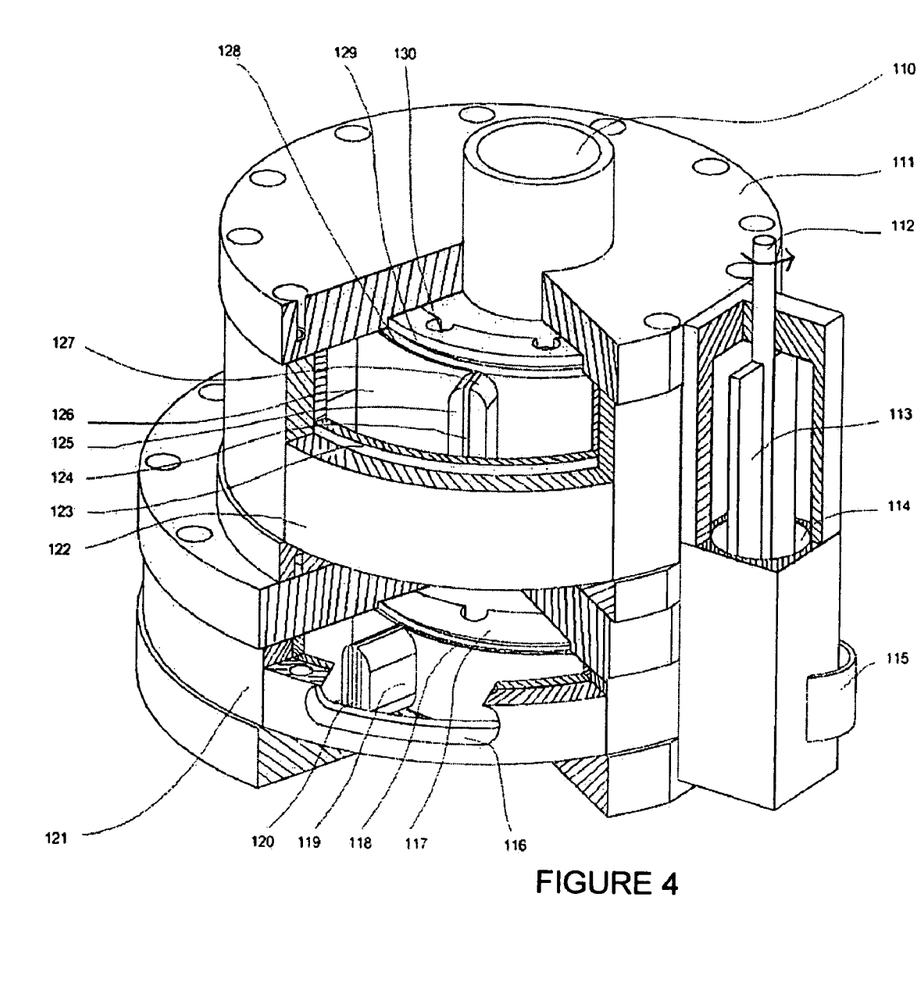
FIG. 4, is a schematic isometric view of a rotary engine where compressor (122) and turbine (121) housings are arranged back-to-back thereof, the compressor rotor (126) is coaxial with the turbine rotor (117). Combustion occurs externally within a cyclo chamber (114) and expansion occurs within the turbine.

The embodiments of the invention for which an exclusive privilege or property is claimed are described as follows:

FIG. 1 and FIG. 2 depict a preferred embodiment of the internal combustion rotary engine where combustion occurs within the turbine chamber (66). FIG. 3 depicts a different preferred embodiment of an external combustion (74, 92) rotary engine where combustion starts in a chamber (72) prior to entry within the turbine expansion chamber (103). The rotary combustion engine casing (21, 35,44) comprises at least one rotary compressor unit wherein, said unit has inner (19,48) and outer (46) housings. The engine casing also comprises at least one rotary turbine unit wherein, said unit has inner (59) and outer (57) housings. Said housings are surrounded by a liquid cooled jacket (18,41,45). For example, water may be used as coolant. The housings have each, a circularly cylindrical (3, 13) rotor (12,128), rotatably and eccentrically mounted. The said rotary engine breathes through the intake (20) and exhaust (34,116) ports. The compressor rotor outer boundary (83,126) and turbine rotor outer boundary (98) are sealingly (101) mounted (90, 95) tangent to the chamber inner peripherals (88, 97). Accordingly, the respective rotor outer boundary and the chamber inner peripheral are osculating at their common tangency plane (90, 95). As shown in more detail in FIG. 5, each of the said rotors (135) have an internal vane groove (1) and many seal slots (118, 129, 134, 136) and oil cooling holes (2, 130, 133).

The sliding vane also carries many slots (14, 38, 40, 52, 64, 84, 124, 120) that accommodates seals. The radially outer vane tips (86, 101, 109) are always in a natural contact with the housing inner peripheral (88, 97). This is because the housing inner peripheral is non-circular and has a cycloidal shape that accommodates well an eccentrically placed sliding vane of fixed length. As seen from FIG. 6, The cycloidal peripheral (88, 97) is a unique shape, mainly depending on 4 parameters: the radial offset distance between the rotor center 'o' and the center of the chamber 'c', the sliding vane length 'L', the seal height (145) and the seal spring (144). The dynamic and thermal loading behaviour of the seal spring under rotation and the circumferential temperature differences may slightly alter the cycloidal shape.

Figure 5:
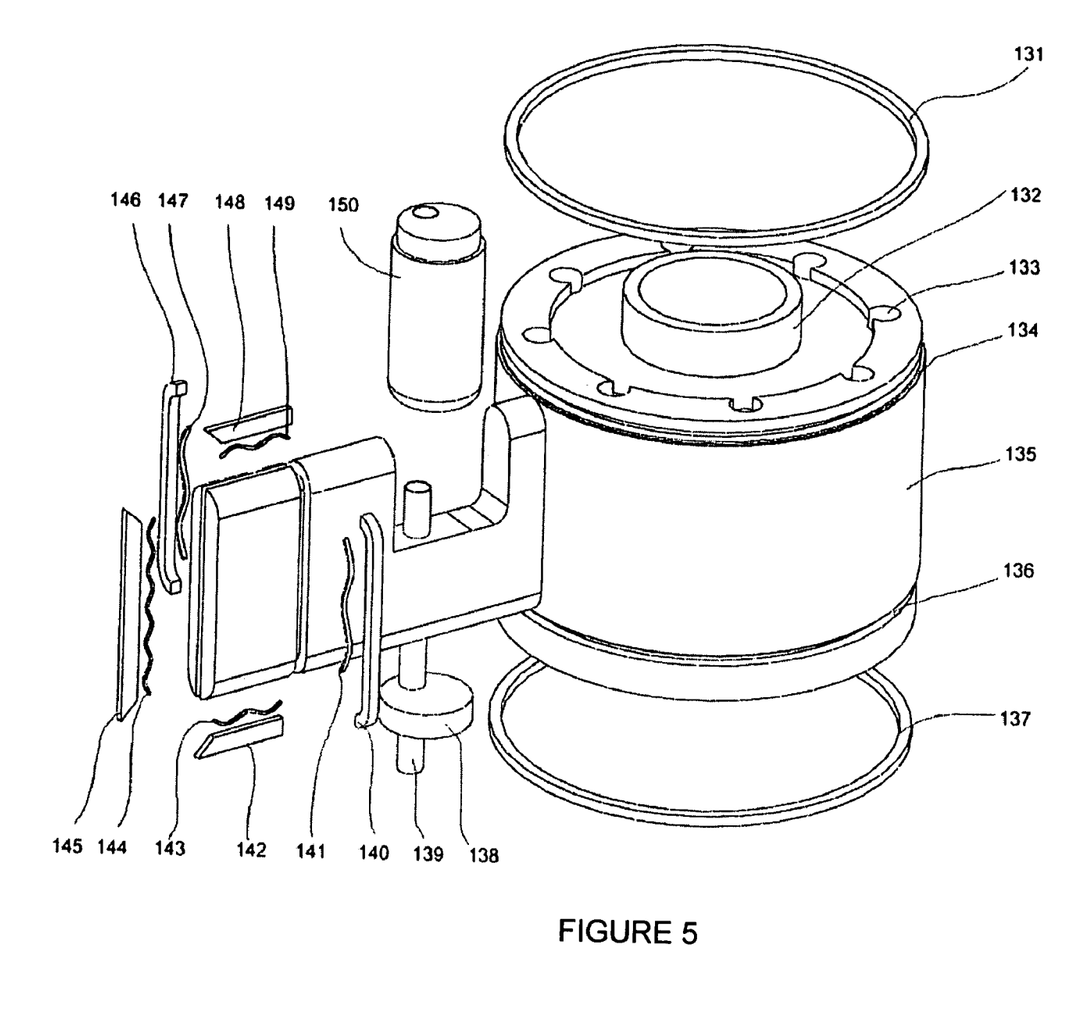
FIG. 5, is an exploded isometric view of rotor (135), sliding vane, sealing elements (131, 137, 140, 145, 146, 148), under seal springs (141, 143, 144, 147, 149), vane retention pivot axle (150) and pin (138, 139).

The machining and the manufacturing of the cycloidal shape of the present invention is achieved by enlarging by a distance 'δ', both opposite sides of the largest circle of diameter 'L' in such a way that, as the rotor rotates around its eccentrically placed axis over a range $0° \leq \theta \leq 180°$, the radially outer tips of the springless vane, define the said cycloidal shape of the housing inner peripheral. The exact coordinates of such cycloidal shape is used in the precision manufacturing of the housing inner peripheral using modern manufacturing techniques, including using CNC techniques The pivot axle vane retention mechanism (54, 55; 61, 62; 81, 82; 104, 105) is a unique mechanism where the pivot is always tangent to the rotor central cavity (80). The pivot is a tubing (150) and retains the pin (139). which is embedded by one end into the sliding vane center socket (FIG. 5). The pivot rotates at twice the speed of the pin and the vane. Roller, gear (not shown) or sliding head (55,81) of said pivot axle is engaging the cylindrical rotor inner peripheral (80) to guide the vane through its eccentric rotating and reciprocating sliding motion.

Intake chamber (53) is receiving the fluid from intake port (20), said fluid is either air, or any other working gas, or any other liquid-gas mixture. Said fluid, is compressed by the compressor rotor (12, 89) and the single rigid sliding vane (50, 87) which is sealingly (86) and movably mounted within the rotor groove. The sliding vane is contoured (127) to fit the said groove. By placing the sliding vane. (16, 50, 87) within the compressor housing, a plurality of working chambers (72, 49, 53 and 106, 107, 108) are sequentially created within the crescent shaped cavity, delimited by the compressor housing inner peripheral (88) and the rotor outer surface (83). When compared with gas turbine engine compressor, the rotary compression work is at least 2-15% more efficient as the fluid is sealed within the closed control volume (49, 107). The compression work within the crescent shape is smooth and gradual and therefore the compression is nearly isentropic. As a result of the rotation of the rotor, a periodic sequence of compressed fluid is delivered to the exhaust port (56, 76) of the compressor housing. The rotary combustion engine compressor casing is sealed at its opposite ends by bolted (9) plates (10). One of the compressor end plates is apertured at its centerline to allow for the drive shaft.

FIGS. 1, 2 and 3 depict preferred embodiments where compressor and turbine housings are arranged in tandem. For such configurations, power and torque transfer and synchronization of compressor and turbine rotors (12, 3) and valve rotation (67, 69) are achieved with drive shafts (31, 8, 6, 69), gears (33, 28, 26, 24) or other transmission mechanisms (7, 25, 30), and bearings (not shown) supported by the engine casing (32, 21, 22, 23, 27). For the preferred embodiment depicted in FIG. 4, power transfer between the turbine and the compressor is much simpler, as the compressor (129) and turbine (117) rotors are directly coupled to the drive shaft (110). The shaft is journalled in bearings supported by the engine casing (121, 122). The back-to-back compressor and turbine configuration is compact and lightweight as no gear, pulley and auxiliary power and torque transfer equipment is used. A fluid transfer passage (114) connects the exhaust port (76) of the compressor and the intake port (73) of the turbine. In the external combustion engine depicted in FIG. 3, the said transfer passage includes a combustion chamber (74, 92) which is periodically pressurised by gas flow from the compressor exhaust port. Downstream of said compressor exhaust port there is at least one check valve and/or at least one cyclo-valve (67, 68, 93), operating between open and closed positions, in timed sequence with the passage of the turbine sliding vane (100). The closed position (94) of the said valve prevents gas flow from the combustion chamber into the compressor. The cyclo-valve comprises a tubing (70) having inlet and exhaust ports (71) and a rotatably and sealingly mounted slotted cylinder (69) within the said tubing.

Figure 7:
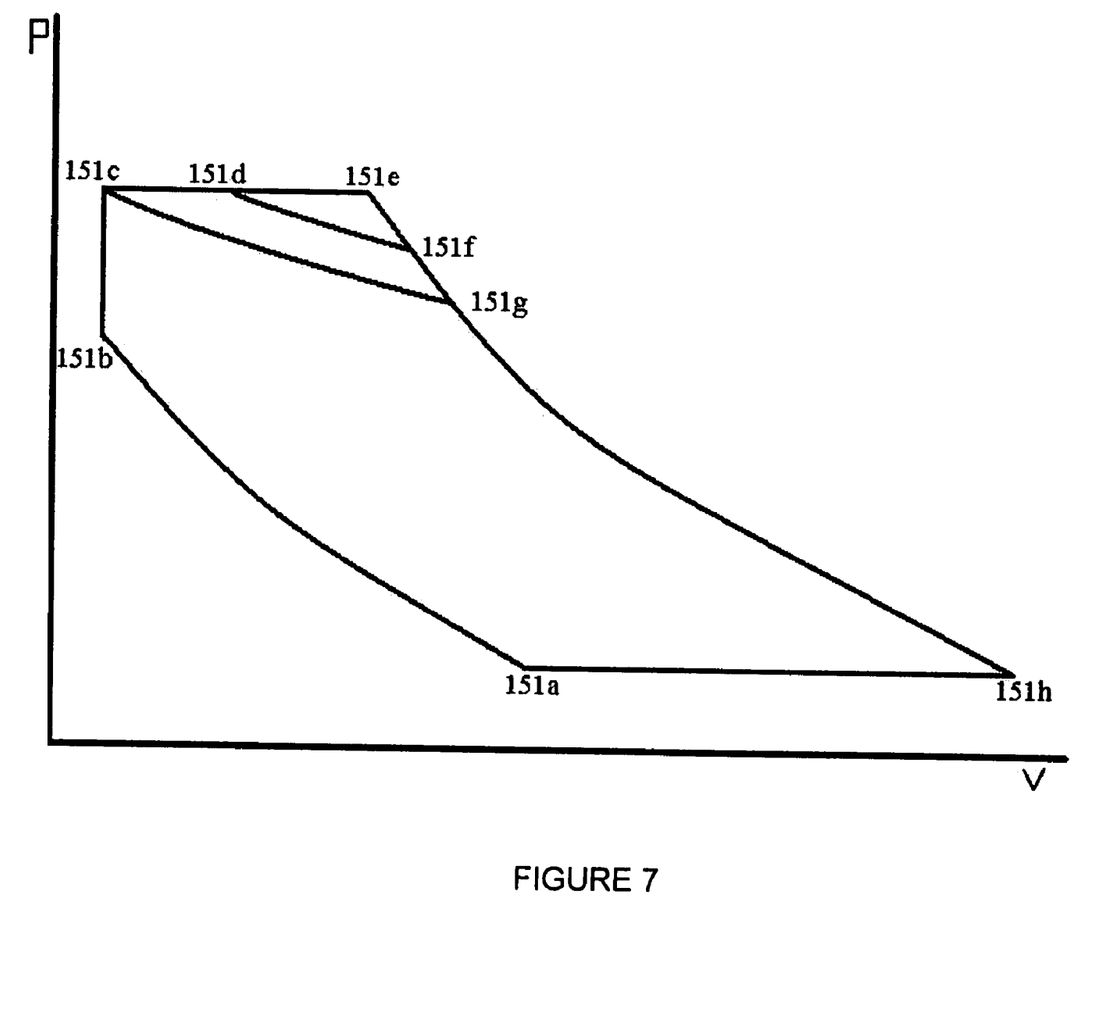

Two firing cycles occur per rotor revolution. As one firing takes place in the chamber (91), new cycles in the chambers (92, 107, 108) are preceding the present firing and at least one old cycle (60,99) is terminating thereof, a smooth operation is assured. The rotary turbine unit is similar to the compressor unit but its size differs. Working chambers (60, 66, 103, 99), belonging to the turbine are delimited by the housing inner peripheral (97), the rotor outer surface (98) and the side surface of the sliding vane (37). For FIG. 3, the combustion working chamber (74) and the expansion chamber (103) are separate but linked. Thus, the turbine housing is allowed to run at a reduced temperature. A periodic sequence of expanded fluid is delivered from the exhaust port (34) with each rotation of the turbine rotor in response to high pressure and temperature gas expansion in the said turbine. The exhaust gas pressure is lowered to about local ambient pressure values to allow maximum shaft work extraction and increase in thermal efficiency. As shown in FIG. 7, the maximum volume of the turbine expansion chamber (66) is sized such that the combusted gas pressure (151*e*, 151*f*, 151*g*) is expanded to local ambient pressure (151h). The height of the turbine inner housing (36) and the turbine rotor (117) is sized in such a way that, the pressure of the gas, as it is being transferred from the compressor chamber (72) is maintained to about a constant high value (151b). The turbine casing (35) is sealed at its opposite ends by bolted (42) plates (43). One of the said plates is apertured at its centerline, to accommodate the drive shaft (31) protruding therefrom.

A fuel or a fuel/atomiser mixture (75) is supplied to said combustion chamber (74, 66) using commercially available fuel injection or fuel aspiration means. The fuel/oxidizer mixture is ignited using commercially available spark (91) or pressure ignition means. For each 360 degrees of rotation of said compressor rotor, there are two complete is and consecutive cycles of intake (108, 151a), compression (92, 151ab), combustion (74, 151bce; 151bcdf; 151bcg), power (66, 103, 151eh; 151fh; 151gh) and exhaust (60, 99, 151h) phases.

The thermodynamic cycle associated with the intake, compression, combustion, expansion and exhaust phases of the rotary engine contains innovations when compared to the Otto, Brayton, Diesel or more recent increased expansion cycles proposed in prior arts (PCT WO 02/090738, DUNCAN, Ronnie J. , Nov. 14, 2002: U.S. Pat. No. 5,341,771, RILEY, Michael B., Aug. 30, 1994). At intake, compression and combustion phases, the present invention combines the advantages of Otto and Diesel thermodynamic cycles. It is well known that for a given compression ratio, the ideal Otto cycle currently provides the most efficient combustion/expansion process since it combines high peak temperature during the isochoric (constant volume) heat addition, while still keeping an acceptable mean chamber temperature. However, high peak combustion temperatures can cause auto-ignition of a portion of fuel-air mixture, resulting in engine knocks. Diesel is an improvement of the Otto cycle as it provides higher useful compression ratios and isobaric (constant pressure) heat addition and do not have knock problem as air alone is present during the compression process. The high compression ratio makes Diesel engines more fuel-efficient but for this same reason, they also become much heavier. Compared to the Otto cycle, Diesel cycle also delivers less power for the same displacement. For the compression and combustion phases of the cycle, the ideal would be to follow a limited combustion pressure cycle that would first use a combined isochoric heat addition followed by isobaric and/or isothermal heat additions. As mentioned in a prior art, (U.S. Pat. No. 5,566,650, KRUSE, Douglas C., Oct. 22, 1996) such hybrid engine process has been developed (Texaco TCCS, Ford PROCO, Ricardo, MAN-FM and KHD-AD) but they have been proven impractical. The rotary engine of the present invention naturally follows the above-described limited peak cycle (151bce; 151bcdf; 151bcg) multi-step (isochoric, isobaric and/or isothermal) combustion phases.

By limiting the peak combustion pressures, the present invention also provides an expanded power stroke that improves power extraction (151eh; 151fh; 151gh). A search of the prior art did not disclose any patents that considers a thermodynamic heat engine cycle, whether it be reciprocating or rotary, that jointly proposes a limited peak combustion pressure and an expansion phase where the pressure exhausts to about ambient pressure.

One of the drawbacks of the current gas turbine engines are their highly sensitive stall characteristics always placed close to the high performance region. Furthermore, shaft and aero-thermodynamic coupling and feedback loop between the compressor, and the turbine, only allows a narrow, high efficiency operational band. The present invention provides a practical and effective means of adding higher degrees of freedom to the gas turbine engines by eliminating the shaft coupling between fans, compressors and turbines. The compound engine (FIGS. 8, 9, 10) of the present invention combines the efficiency of the heat engines with the compactness, lightweight and high power characteristics of gas turbine engines. Heat engines can produce kilowatts of power at high power densities and efficiencies but they are heavy and of relatively large sizes. After 50 MW, most of thermodynamic scaling and cost considerations have favoured large size gas turbine engines. 100 MW gas turbine combined cycle power plant costs about 500 USD per kW, whereas 10 MW power plant costs 750 USD per kW and 1 MW power plant costs 1000 USD per kW. For small power range (0.1-10 MW), internal combustion engine becomes highly competitive despite their size, weight and high maintenance cost. The present invention overcomes the limitations of both small gas turbine engines and large internal combustion engines and meets the modularity, high efficiency, mobility weight and cost requirements of today's modern power and propulsion applications.

The invention provides a preferred embodiment of a high mass flow propulsion device. This is achieved by a mechanical coupling (162, 165, 167) of the rotary engine components with conventional gas turbine engine components. The turbo-rotary compound engines (FIGS. 8, 9, 10) of the invention, eliminates conventional long and heavy concentric shafts and disclose a novel configuration where conventional rotational wing (186), fans (153, 155) compressors (158, 161, 182, 197) and turbines (170, 171, 178, 191) are only aero-thermodynamically coupled with each other. In this invention, rotary turbines (154, 156, 157, 163, 181, 188, 196) drive said rotational wing, fans and compressors. Conversely, said conventional turbines drive single or a plurality of rotary compressors (164, 166, 168, 179, 195, 190). Rotary compressors supply compressed fluid via flexible high-pressure connections (172, 187, 189, 194). Relatively low mass flow will move through such connection as both rotary compressors and turbines are partial admission machines. Low mass flow also favours the efficient use of intercooler (193) and reheat (198) systems, giving a further boost to thermal efficiency. The compound engine of the invention combines the thermal efficiency of the rotary internal engine cycle and the high mass flow, compact size and lightweight of the gas turbine engines. Such a compound cycle propulsion engine may comprise propellers, conventional fans, contra-rotating fans, hub-turbine driven fans (177, 176), contra-rotating hub-turbine driven fans (175, 174), axial and/or centrifugal compressor stages, combustion chambers (173), axial and/or centrifugal turbine stages, rotary compressors and turbines, intercoolers and reheaters. The current design is versatile and simple, therefore well adapted to turboprop, turbofan, marine and land based power production and refrigeration applications. The subject design can also be applied to geothermal power plants.

As is demonstrated by the breath of this description, the range of application for the compound and solo use of the turbo-rotary engine provided by the invention is truly vast. In particular, the scope of the present invention includes hybrid turbo-rotary engines where conventional axial and/or radial turbines drive both conventional axial and/or centrifugal compressors and rotary compressors. Also included in the present invention, hybrid applications where conventional axial and/or centrifugal compressors are driven by both conventional axial and/or radial turbines and rotary turbines. While the description cannot address each and every application, it is intended to indicate the extensive capabilities contemplated by the invention.

The invention claimed is:

1. A method of operating a heat engine having a sliding vane rotary vane compressor and a sliding vane rotary vane turbine, comprising: the sequential steps of:
   a first step of intaking a fluid in an intake phase into a working chamber of the rotary vane compressor at ambient pressure;
   a second step of compressing the fluid in a compression phase in the working chamber by rotating a rotor of the rotary vane compressor up to 360° of rotation;
   a third step of mixing the compressed fluid with a fuel and igniting the mixture in an initial combustion phase in a combustion chamber external to both the rotary vane compressor and the rotary vane turbine to carry out a limited temperature constant volume combustion process;
   a fourth step of subjecting the combustion products from the third step to a constant pressure combustion process in a final combustion phase followed by a power expansion phase in an expansion chamber of the rotary vane turbine by rotating a rotor of the rotary vane turbine up to 360° so that the pressure of the combustion products within the turbine expansion chamber reaches ambient pressure or near ambient pressure when the turbine expansion chamber volume reaches its maximum; and
   a fifth step of exhausting the combustion products in an exhaust phase from the expansion chamber.

2. A method according to claim 1; wherein for each 360° of rotation of the rotors of the rotary vane compressor and the rotary vane turbine, there are two complete and consecutive cycles of intake, compression, combustion, power expansion and exhaust phases.

3. A compound propulsion engine comprising: a primary stage including an axial compressor having compressor blades and a rotary shaft defining an axial direction such that ram air is compressed and exits the axial compressor in the axial direction, a sliding vane rotary vane turbine driven by the exiting compressed air and connected by an interconnecting shaft to rotationally drive the axial compressor, and a combustor that is disposed downstream of the axial compressor and that adds heat energy to the exiting compressed air to produce combustion products; and a secondary stage including an axial turbine having turbine blades and a rotary shaft extending in the axial direction and driven by the combustion products exiting the combustor, and a sliding vane rotary vane compressor connected by an interconnecting shaft to the axial turbine so as to be rotationally driven by the axial turbine, the sliding vane rotary vane compressor being connected to receive and further compress a portion of the ram air or a portion of the compressed air exiting the axial compressor to produce a secondary compressed air flow that is directed through one or more transfer passages to an intake of the sliding vane rotary vane turbine.

4. A compound propulsion engine according to claim 3; further including a reheater disposed in one of the transfer passages.

5. A compound propulsion engine according to claim 3; further including an intercooler disposed in one of the transfer passages.

6. A compound propulsion engine according to claim 3; wherein the first and second stages are aero-thermodynamically coupled to each other and are not mechanically connected together by a shaft.

* * * * *